No. 723,727. PATENTED MAR. 24, 1903.
P. PFEIL.
CAR OR VEHICLE PROPULSION.
APPLICATION FILED OCT. 14, 1902.
NO MODEL. 2 SHEETS—SHEET 2.
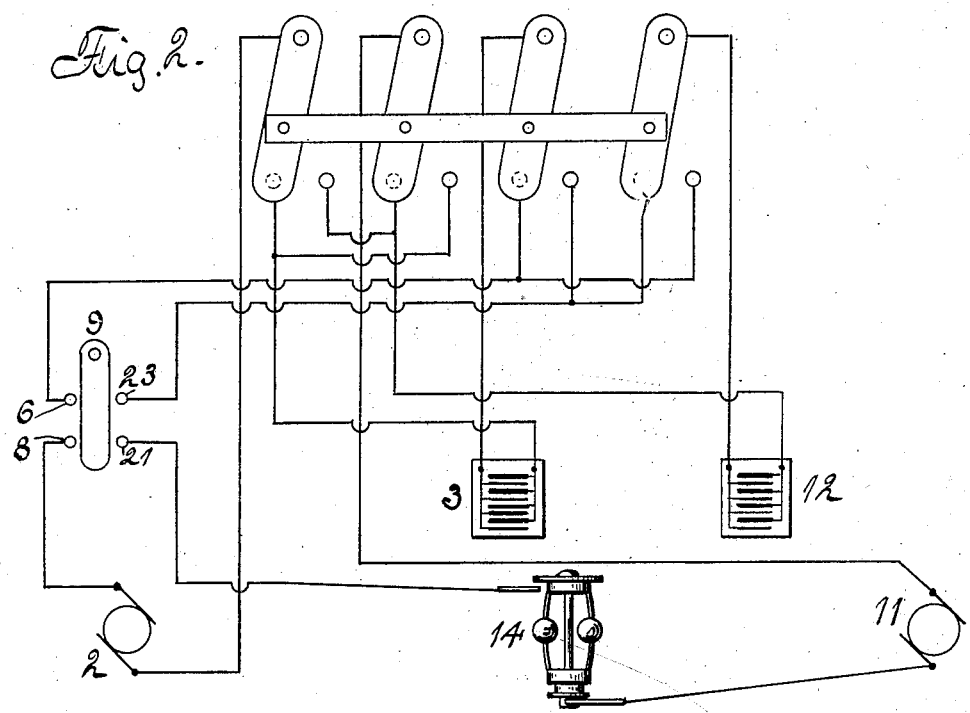
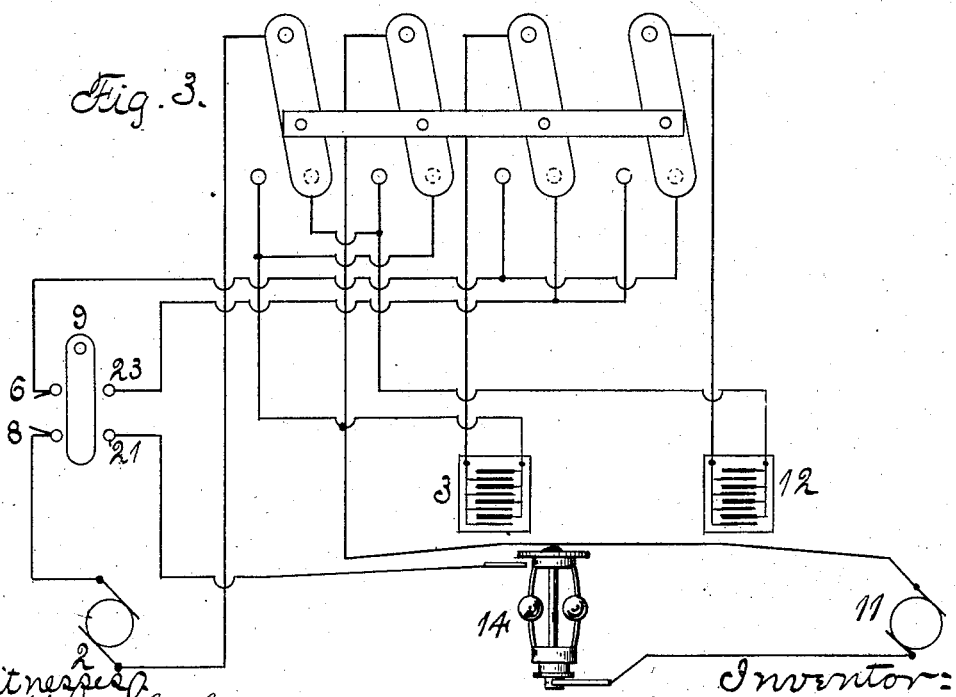
Witnesses
H. J. Slagle
E. Behel
Inventor:
Philip Pfeil
By A. O. Behel
Atty.

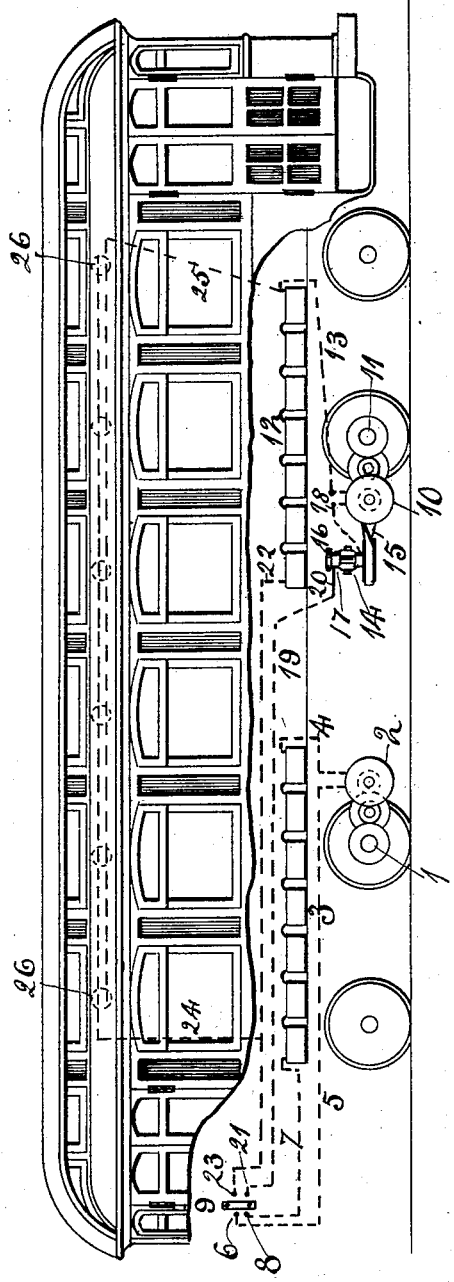

UNITED STATES PATENT OFFICE.

PHILIP PFEIL, OF CHICAGO, ILLINOIS.

CAR OR VEHICLE PROPULSION.

SPECIFICATION forming part of Letters Patent No. 723,727, dated March 24, 1903.

Application filed October 14, 1902. Serial No. 127,243. (No model.)

*To all whom it may concern:*

Be it known that I, PHILIP PFEIL, a citizen of the United States, residing at Chicago, in the county of Cook and State of Illinois, have invented certain new and useful Improvements in Car or Vehicle Propulsion, of which the following is a specification.

The object of this invention is to utilize the momentum of a car or other vehicle after motive power has been cut off to charge a storage battery and the power thus stored in the battery to be used for lighting or other purposes, as may be required.

In the accompanying drawings, Figure 1 is a side elevation of a car, showing my improvements in connection therewith. Figs. 2 and 3 are diagrams showing the wiring. Fig. 4 is an elevation of a centrifugal governor.

In running trolley-cars or cars equipped with storage batteries the current is cut off by the motorman in making a stop or descending an incline and the brake is used to bring the car to rest or prevent it from getting beyond control in descending the incline. I propose to utilize the momentum of the car after the power employed to run it is cut off to charge a storage battery from which electricity may be used to light the car or propel it after the main storage battery has become exhausted.

The general construction of the car shown in the accompanying drawings is old and is illustrated in order that my improvements may be better understood. In this instance the car-body is supported upon two trucks, each having two wheels. The rear axle 1 of the front truck is rotated by an electric motor 2, having a gear connection therewith, in the usual manner. The main storage battery 3 is located in the car, and a wire 4 connects the pole of the battery with the motor. A wire connects with the other pole of the battery and extends to the end of the car and terminates in a point 8. A wire 5 connects with the motor and extends to the end of the car and terminates in the point 6. A lever 9 has a pivotal connection at one end with a stationary support and is adapted to move over the points 6 and 8 and close the circuit through the main storage battery and motor, which will rotate the motor, and the motor will rotate the axle 1 and move the car, as is now generally used. A dynamo 10 has a gear connection with the forward axle 11 of the rear truck, and as the car is moved the dynamo will be rotated. A secondary storage battery 12 is located in the car, and a wire 13 connects one pole of the battery with the dynamo. A ball-governor 14 is supported in any suitable manner, and a belt 15 connects it with the dynamo-shaft or other rotating part. The sliding head 17 of the governor has an overhanging cap 16, and as the governor is rotated the cap will be moved in the lengthwise direction of the shaft of the governor. A wire 18 forms a connection between the dynamo and governor. A wire 19 is connected with a spring-arm 20 at one end, and its other end terminates in a point 21. A wire 22 has one end connected with the secondary storage battery and its other end terminating in a point 23. The points 21 and 23 are located close to the switch-lever 9, so that the lever can be moved over them and close the circuit including the secondary storage battery, dynamo, and governor. The governor is so adjusted that when the voltage of the dynamo exceeds the voltage of the secondary battery the head 16 will be moved in contact with the spring-arm 20, forming an electrical contact, and when the voltage of the dynamo drops below the voltage of the secondary storage battery the head of the governor will move away from the spring-arm and break the electric contact.

When the car is being propelled by the main storage battery, the switch-lever 9 will cover the contact-points 6 and 8 and the circuit including the dynamo will be broken at the points 21 and 23.

When the car is being propelled, the dynamo will be driven; but as the circuit is broken it will require very little power to run it.

When the circuit to the motor is broken by throwing the switch-lever off the points 6 and 8 and the lever is moved over the points 21 and 23, a circuit is closed including the secondary storage battery, dynamo, and governor, and if the speed of the dynamo is sufficient to generate electricity having a voltage above the voltage of the secondary storage battery the governor will close the circuit, and the secondary storage battery will be charged from the dynamo. When the speed of the car has decreased so that the dynamo will not generate electricity of a voltage above the voltage of the secondary storage battery, the governor will break the circuit, thereby preventing the secondary storage battery exerting its force on the dynamo and turning it into a motor.

The electricity of the secondary storage battery may be used for lighting the car, and the wires 24 and 25 connect the battery with the lamps 26.

The circuit including the dynamo and secondary storage battery cannot be established while the car is being driven from the main storage battery and the voltage of the dynamo below the voltage of the secondary storage battery. By this arrangement the momentum of the car after the current driving it has been shut off is utilized to drive the dynamo and store electricity in the secondary storage battery for future use.

In the drawings I have shown the wiring necessary for moving the car in one direction only, and it is the work of an electrician to wire the car so it will run in both directions.

I have shown a main storage battery for running the car, while it is evident that the trolley system might be used. When the car is run from a storage battery, the car can be wired so that should the main battery give out the secondary storage battery could be switched in to run the car and the dynamo thrown in circuit with the main storage battery, as shown in the diagram at Figs. 2 and 3. Fig. 2 shows a system of wiring and switches which will run the motor from the main storage battery and charge the secondary storage battery from the dynamo, and Fig. 3 shows the same system in which the motor is run after the secondary storage battery and the dynamo charging the main storage battery.

By this system of propelling cars or vehicles when the main storage battery has become exhausted the secondary storage battery is used to run the vehicle and the main storage battery partly charged, and when the secondary storage battery is exhausted the main storage battery may be used, and so on until both batteries are exhausted, and a greater distance run than if the main storage battery were used until exhausted.

This system is especially applicable for automobiles when a considerable portion of the road is downhill. It is also evident that the motor used to propel the car could also be used as a dynamo when not used as a motor without departing from the scope of my invention.

I claim as my invention—

1. In car or vehicle propulsion, the combination of a main storage battery, a secondary storage battery, a motor, a dynamo, switching devices for throwing the dynamo into circuit with either battery, switching devices for throwing the motor into circuit with either battery, and a mechanically-operated device for cutting out the dynamo when its voltage is lower than the voltage of the battery it is charging.

2. In car or vehicle propulsion, the combination of a main storage battery, a secondary storage battery, a motor, a dynamo, switching devices for throwing the dynamo into circuit with either battery, switching devices for throwing the motor into circuit with either battery, a mechanically-operated governor for automatically holding the circuit closed including the dynamo and battery when the voltage of the dynamo is above the voltage of the battery it is charging and automatically breaking the circuit when the voltage of the dynamo is lower than the voltage of the battery it is charging.

PHILIP PFEIL.

Witnesses:
A. O. BEHEL,
E. BEHEL.